United States Patent Office 3,263,064
Patented July 26, 1966

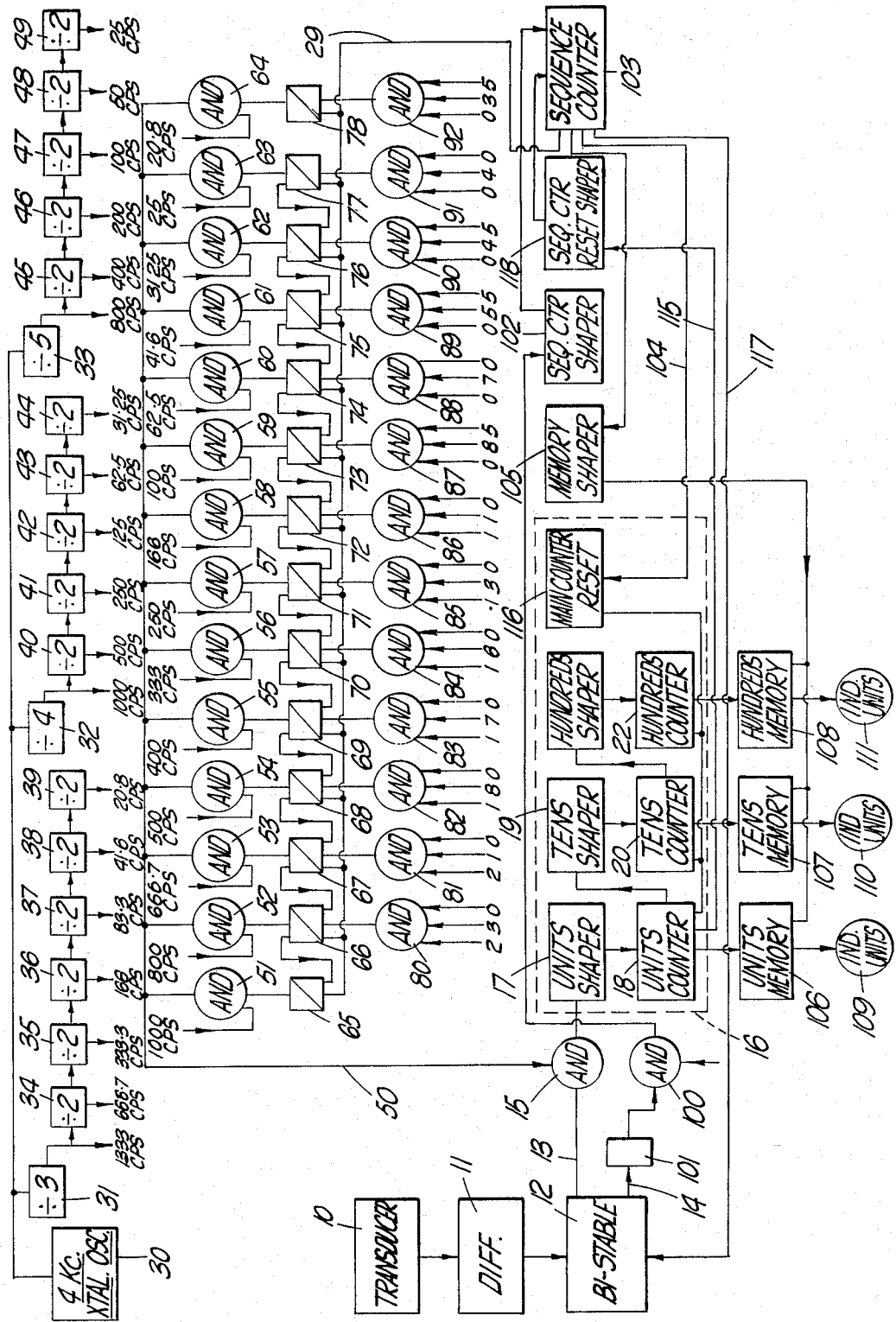

3,263,064
APPARATUS FOR DETERMINING THE REPETITION FREQUENCY OF PULSE SIGNALS
Herman Lindars, The Glen, Endcliff Vale Road, Sheffield 10, England
Filed Feb. 25, 1963, Ser. No. 260,383
Claims priority, application Great Britain, Feb. 27, 1962, 7,648/62
5 Claims. (Cl. 235—92)

This invention relates to apparatus for determining the repetition frequency of repetitive pulse signals. For many purposes it may be required to measure the repetition rate of pulse signals, for example, heartbeats, and the present invention is directed to apparatus for directly determining the repetition rate of any signals which can be transduced to provide electrical pulses.

The usual way of measuring the repetition frequency of such signals is to count the number of pulses in a given period. This means however that the repetition frequency cannot be determined until the end of the counting period. Particularly where the frequency is to be maintained constant, it is desirable to know as soon as possible whether there is any change of frequency. If the frequency is constant, the time interval between successive pulses is also constant and by measuring this time interval the frequency can be determined. Such a requirement for knowing as soon as possible any change in frequency arises for example in the playing of music and particularly in the conducting of an orchestra. It is necessary that the conductor should keep the speed of the music constant but, particularly in recording where it is a common practice for short passages of the music to be recorded separately on magnetic tape, great care has to be taken that the speed is kept constant over a long time period. It is desirable however, that as soon as recording of a passage commences, an immediate indication should be available of the actual speed at which the music is being played.

It is an object of the present invention to provide an improved form of apparatus for determining the repetition frequency of pulse signals from the time interval between a pair of successive pulses.

According to this invention apparatus for determining the repetition frequency of repetitive pulse signals comprises a constant frequency oscillator, and a counter arranged at a predetermined time after the receipt of one pulse to start counting down on receipt of each successive signal fed from said oscillator to said counter and to continue counting down until the receipt of the next pulse, said counter including output means responsive to the counted down output at the end of the count-down, the counter being initially set to represent a frequency corresponding to pulses spaced at said predetermined time interval and the frequency of the oscillator being so chosen that, for longer intervals, the number of cycles of output of the oscillator is equal to or greater than the required rate of count-down to give an output representing the pulse recurrence frequency, the counter being arranged to count-down only on receipt of predetermined signals in the regular repetition sequence of signals from the oscillator so that the count always approximates to the frequency corresponding to the interval between the pulses. The frequency is proportional to the reciprocal of the number of pulses which would occur between two successive input signals and the system of counting, in effect, converts a reciprocal curve to approximately a straight line. The approximation may readily be made to any required degree of accuracy and, if a digital output indicator is employed, would usually be made so that the least significant digit displayed is correct.

The invention may perhaps be more clearly understood by considering a specific example. For convenience in this example it will be assumed that the output means is an indicator although it will be appreciated that an indicator is not essential if, for example, the output was used solely for control purposes. Suppose that the pulse recurrence frequency that is to be determined lies between the range of 240 pulses per minute and 30 pulses per minute. A frequency of 240 pulses per minute means that there is one-quarter of a second i.e. 250 milli-seconds between the successive pulses. For this range of frequencies it is convenient to use an oscillator having a frequency of one thousand cycles per second. The counter is initially set so that the indicator shows 240, that is to say the maximum frequency to be measured. If the output signals from the oscillator are counted starting at 250 milli-seconds after the first of the two pulses being considered, and if impulses are produced at the end of each complete cycle of the oscillator output to activate the counter to cause it to count-down in steps once for each cycle of the oscillator output, then the indicator will indicate 239 if only the first cycle of oscillator output was completed before the second pulse determining the end of the count-down and would indicate for example 230 if ten complete cycles of the oscillator were received before the end of the count-down period. It may readily be seen by considering a mathematical analysis that thus far the indicator is correctly indicating the required frequency since a frequency of 230 pulses per minute corresponds to a time interval of 260 milliseconds. However as the frequency gradually decreases that is to say the interval between the pulses gets longer, it will be found that the number of impulses from the oscillator is more than is required for counting down on said output means. By the time the indicator is required to have counted down 15 steps, 16 impulses will have been received from the oscillator but that counter would be correct if it were arranged so that one impulses is lost before the indicated count-down is 225. Another pulse would have to be lost before the indicated count-down is down to 220 and so on. Such periodic losing of a pulse provides one way of putting the invention into practice. This may readily be done with an electric or electronic counting circuit and a separate indicator by arranging that the counting circuit is operated by each pulse from the oscillator but certain steps on the counting circuit do not actuate the indicator. When the time interval between the successive pulses has a value corresponding to a frequency of pulses of 180 per minute, it is necessary to lose one or more impulses from the oscillator for each impulse counter. In the simple arrangement thus far envisaged, it is convenient therefore at this stage to divide the frequency of the oscillator by two by a frequency divider circuit and use impulses derived from the divided frequency signal so that for frequencies slightly lower than 180 per minute no impulses need be lost. Similarly when the rate of pulse recurrence has dropped to 130, it is convenient to divide the frequency of the oscillator again by two to employ impulses at 250 cycles per second. When the period between the pulses corresponds to a repetition frequency of 90 per minute, the frequency may then be divided by two again and another division by two is made at a time corresponding to a frequency of 60 per minute and yet another division by two at a time corresponding to a frequency of 40 pulses per minute. By changing the frequency in this manner the number of impulses to be discarded is kept quite small and it is readily possible to arrange ring-type counting circuits to be effective to operate the indicator or other output device only in response to the predetermined selected impulses from the oscillator discarding certain unwanted ones at various stages in the count. It will be seen that any required accuracy of indication of the frequency corresponding to the pulse interval may readily be obtained by choosing suitable oscillator frequencies and that, in the above example, by discarding pulses at the appropriate stages in the count, the required frequency can always be indicated to the nearest unit.

It will be seen more generally, that the aforementioned constant frequency oscillator may be provided with a number of frequency dividing circuits arranged in cascade to produce a series of submultiples of the oscillator frequency, and that the impulses from the basic frequency of the oscillator may be used as timing pulses being fed to a simple ring counter counting these various pulses and at the appropriate time intervals operating switches to feed the impulses from the sub-divided frequencies to said ring counter and to connect the output means to give indications derived from the appropriate sub-divided frequency. Such ring counters may readily be made using transistors or other solid state devices. By providing signals of a number of different frequencies, it is readily possible to avoid any necessity for losing pulses in the manner described above and simple ring counters may be employed, conveniently ten stage counters for units, tens and hundreds so that a decimal output indication can readily be provided.

Thus in the preferred way of putting the invention into practice, said oscillator is coupled to a series or plurality of series of frequency dividers to provide output pulses at a number of different repetition frequencies for feeding to the counter and detecting means are provided operative when the counter output reaches each of certain predetermined numbers to select a different divider output with the appropriate new lower frequency for feeding to said counter.

The output indication conveniently is provided on a digital output indicating device such as a set of digitrons which give a visual numerical indication of the frequency corresponding to the time period between two successive pulses. It will readily be apparent that the apparatus can operate on each successive time interval between pulses of a series of repetitive pulses, the counter after actuating the output means, being re-set to re-commence a cycle of operation. The output indicator may be arranged to retain the indication until the next successive indication is available. It will be appreciated that the requirement for an instantaneous frequency indication based on the time interval between a pair of pulses arises only if this frequency determination has any significance, that is to say the time intervals between the successive pulses is substantially constant. The output indication would then remain substantially constant. Typically one might have a three digit display in which the least significant digit might intermittently change due to variations in the intervals between pulses.

In the foregoing description mention has been made to counting down from a datum since it makes the arrangement easier to understand. It will be appreciated however that the counting circuit merely has to count impulses and it could count up or count down provided that, as the number of impulses counted increases, the indicator shows the appropriately smaller number representing the frequency. If the counter counts up it would be necessary for the connections to the indicator to be arranged so that the indication changes to a lower value for an increase in count. Similarly it will be appreciated that although reference has been made to counting from a datum number corresponding to the number of impulses in the period corresponding to the highest frequency to be indicated, the counter need not be set at a datum level initially provided the connections to the indicator is arranged so that the indicator shows the appropriate frequency value.

The pulses for controlling the device may be derived in various ways depending on what it is to be measured or controlled. In some cases, transducers may be used to provide electrical pulses from input data, as for example if measuring heartbeats. In other cases, it may be convenient to have manually operated switches, for example, a conductor conducting an orchestra might have a switch in or on his baton or operated by the movement of the baton to provide the required pulses for an indicator indicating the speed of the music.

The following is a description of one embodiment of the invention, reference being made to the accompanying drawing which is a diagram illustrating an apparatus for indicating the repetition frequency of heartbeats.

Referring to the drawing, input pulses from a transducer 10 responsive to the heartbeats are fed through a differentiating circuit 11 to one input of a transistor bi-stable circuit 12. This bi-stable circuit is arranged so that, when set in one state by an input signal from the transducer 10, it gives no output on two output leads 13, 14. When the bi-stable circuit is set in its other state, by means to be described later, there is a direct voltage output on the leads 13, 14. The signal on lead 13 is gated by a gate 15, which is controlled in a manner to be described later, to provide a series of pulses which are fed to a counter 16. In this counter 16, the pulses from the gate 15 pass first to a pulse shaping unit 17, referred to hereinafter as the "units" pulse shaping unit, and thence to a units counter 18. The counter 18 is a ring counter formed of ten trigger-controlled gas tubes arranged in the known manner so that the successive pulses for the shaping unit 17 cause the gas tubes to fire in sequence around the ring and thus the particular tube which is conductive indicates the number of units in a total count of pulses. Carry pulses from the tenth tube in the ring of counter 18 are fed to "tens" pulse shaping unit 19 and thence to a "tens" counter 20 which conveniently also is a ring counter of ten trigger-controlled tubes. The carry output pulses from the "tens" counter 20 are fed to a "hundreds" pulse shaping unit 21 and thence to a "hundreds" counter 22. The particular apparatus being described is arranged to indicate frequencies from 240 pulses per minute down to about 30 pulses per minute and, for operating over this range, the hundreds counter needs five tubes corresponding to counts of 0, 100, 200, 300, and 400 units.

The gate 15 is controlled by signals of known frequency derived from a 4 kc./s. crystal oscillator 30. The output from the oscillator 30 is fed in parallel to three frequency dividers 31, 32 and 33. The divider 31 divides the 4 kc./s. frequency by three to provide an output at 1333 c./s. and this output is fed to a chain of six dividers 34 to 39 each dividing the frequency by two. The divider 32 divides the 4 kc./s. frequency from the oscillator 30 by four to provide an output at 1000 c./s. and this frequency is further divided by a chain of five dividers 40 to 44 each dividing the frequency by two. The divider 33 divides the 4 kc./s. frequency from the oscillator 30 by five and is followed by a chain of five dividers 45 to 49 each dividing the frequency by two. These various dividers thus provide a number of different frequencies, all sub-multiples of the 4 kc./s. input and fourteen of these frequencies are utilised as will now be described.

These fourteen frequencies are selectively fed, one at a time in sequence by a lead 50 to the aforementioned gate 15. The selection of the appropriate frequency is effected by fourteen "AND" gates 51–64. To one input of each of these gates is fed signals of one of the frequencies, the 1000 c./s. signal from divider 32 to gate 51, the 800 c./s. signal from divider 33 to gate 52 and so on, as shown in the figure, the frequency fed to the various successive gates 51–64 decreasing and the last gate 64 being fed with a frequency of 20.8 c./s. from divider 39. Associated with each gate is a transistor bi-stable circuit which, in one of its two stable states, provides the second input to the gate. These bi-stable circuits 65 to 78 have a common reset line 79 which, when pulsed, switches bi-stable circuit 65 to a state providing an output signal to gate 51. The pulse on the re-set line 79 switches all the other bi-stable circuits 66 to 78 to the state in which they provide no input to their associate gates 52 to 64. The successive bi-stable circuits 65 to 78 are interconnected in a chain so that, when any one bi-stable circuit is set to a state to give an output to its associated gate, it re-sets the preceding bi-stable in the chain to give no output.

The various bi-stable circuits 66 to 78 can each be set to give an output by means of associated three input "AND" gates 80 to 92 respectively. These "AND" gates are fed with three inputs, one from each of the counters 18, 20 and 22 so that each gate gives an output only when some specific number is recorded by the counter. The various numbers are shown on the drawing against the three inputs to each "AND" gate 80 to 92; for example gate 80 gives an output when the counter is on 230, and gate 81 gives an output when the counter is on 210.

The 500 c./s. output from divider 40 is used to control a gate 100 to which signals are fed via an inverter 101 from the aforementioned output lead 14 from the bi-stable circuit 12. The signal from the lead 14 is inverted by the inverter 101 so that, when a pulse from the transducer 10 sets the bi-stable circuit to give no output on lead 14, the inverter 101 provides an output which is gated by the 500 c./s. signal in gate 100 to produce a series of pulses. These are fed to a pulse shaping unit 102, referred to hereinafter as the sequence counter pulse shaping unit, and are fed thence to a further counter 103, known as the sequence counter. The function of the sequence counter is to effect the operation of various circuits consequent upon receipt of an input pulse from the transducer 10. It is convenient to effect the various operations in succession, giving, where necessary, time for any switching transients to die away before effecting the next operation. Since the output from inverter 101 is gated at 500 c./s., this frequency being derived from the crystal oscillator 30, the pulses fed to the sequence counter are exactly at 2 milli-second intervals. In this particular embodiment, the sequence counter 103 has seven trigger-controlled gas discharge tubes connected in a chain to fire in sequence on successive input pulses. When the output from the transducer 10 switches the bi-stable circuit 12, pulses begin to be fed to the counter 103 (and are no longer fed to the counter 16). The first three stages of the sequence counter 103 are to provide an arbitrary delay of 6 milli-seconds before initiating further action. The sequence counter then feeds out a signal on a lead 104 to a pulse shaping unit 105 which provides a signal to staticizers 106, 107 and 108 which staticize the outputs on the "units," "tens" and "hundreds" counters 18, 20, 22 and apply the staticized outputs to read-out units 109, 110 and 111 respectively. These read-out units are conveniently digitrons giving a visual numerical indication in decimal numerals. After two further pulses from the sequence counter pulse shaping unit, that is to say after a further 4 milli-seconds, the sequence counter 103 provides an output on a lead 115 to a pulse shaping unit 116 in the main counter 16. This pulse shaping unit 116 is known as the main counter re-set pulse shaping unit and provides re-set pulses for the "units," "tens" and "hundreds" counters 18, 20 and 22 to set these at the initial values from which they are to count-down. After a further 2 milli-seconds, the sequence counter 103 provides an output on the aforementioned lead 79 to re-set the bi-stable circuits 65 to 78. Since there is at this time no input to the gate 15, the outputs from the gates 51 to 64 are not being utilised and hence the switching of the bi-stable circuits 65 to 78 does not affect the counting by the counter 16. After yet a further 2 milli-seconds, the sequence performs its final operation which is to provide an output on a lead 117 to the second input of the bi-stable circuit 12. The bi-stable circuit 12 is thus restored to the state it was in before the arrival of the input signal from the transducer 10; it therefore now gives an output on lead 13. This output is gated by the 1000 c./s. signal fed from gate 51 to gate 15 and there is thus a 1000 c./s. input to the counter 16 which starts counting. To prepare for the next cycle of operation, the sequence counter 103 is now re-set by a pulse from the units counter 18. In this particular embodiment, arbitrarily the output from the fifth stage of the "units" counter 16 is used, this output being fed to a sequence counter re-set pulse shaping unit 118 and thence as a re-set pulse to the sequence counter 103.

The above described apparatus operates in the following manner: the maximum pulse repetition rate to be recorded is 240 pulses per minute, that is to say there are 250 milli-seconds between pulses. Thus when a pulse is received from the transducer 10, the counter 16 must start counting down so that, 250 milli-seconds after the pulse from the transducer 10, the counters 18, 20 and 22 will be at 240. The input pulses to the counter initially are at 1000 c./s., that is to say at intervals of 1 milli-second and thus, if counting started instantaneously when the transducer 10 gives an output signal, the counter 16 would have had to be set at 490 so that, after counting down for 250 milli-seconds at the rate of 1 unit per millisecond it would than indicate 240. The counting down continues and, for the next 10 millisceonds, the counter 16 will count-down to 230 at the rate of 1 unit per milli-second. So far the counter 16 would indicate correctly, to the nearest unit, the input pulse repetition rate in pulses per minute, if it were stopped at any time during the count-down from 240 to 230. After 230, if the indication is to be correct, the input pulses to the counter must be at a slower rate. This is achieved by the gate 80 which, when the count has got down to 230, provides an output which sets the bi-stable circuit 66 to give a signal to the gate 52 so that the latter opens to provide an 800 c./s. output to gate 15. The switching of bi-stable circuit 66 re-sets bi-stable circuit 65 so that the gate 51 is closed. Thus only the 800 c./s. signal is fed to gate 15 and the counter 18 continues to count-down. This continues until the count-down reaches 210 when the gate 81 switches bi-stable circuit 67 so that now a signal of frequency 666.7 c./s. is fed to the counter 16. The operation continues in this manner, the frequency fed to the counter 16 being gradually decreased by the appropriate amount when the count-down reaches the values at which the various gates 80–92 operate.

Counting continues until the next pulse is received from the transducer 10. The first action of this pulse is to switch the bi-stable circuit 12 so that there is no longer any output on lead 13 and hence the counter 16 stops counting. The sequence counter 103 comes into operation on the switching of the bi-stable circuit and, as previously described, performs four operations in sequence. Firstly it staticizes the counter settings and puts these values on the read-out indicators 109–111. The staticizers and read-out indicators retain the values to which they are set until the next time a staticizing pulse is provided for the sequence counter. The second operation of the sequence counter is to re-set the counters 18, 20, 22. The third operation is to re-set the bi-stable circuits 65 to 78 and the last operation is to reset the bi-stable circuit 12 so that counting restarts.

In the description of the operation of the apparatus shown in the drawing, it has so far been said that if counting started instantaneously on receipt of the pulse from the transducer 10, then the counters would initially have to be set to 490. The operation, however, is not instantaneous but is delayed, the delay being accurately controlled by the sequence counter 103. If the delay is 14 milli-seconds as described above, then, since 1 millisecond pulses are being counted, the counter would initially have to be set to 476. The re-set pulse from the main counter re-set pulse shaping unit 116 would be fed to the appropriate stages in the counting circuits 18, 20 and 22 to re-set these to the required value. It will be seen that the delay can be any required value necessary to give time for switching transients to die away; the delay is accurately controlled by the sequence counter 103 and the appropriate correction to the indicated output is effected by the proper choice of the datum values to which the counters 18, 20, 22 are re-set.

If the interval between a pair of successive pulses should for any reason be less than the aforementioned predetermined time interval, that is to say less than 250 milli-seconds in the example given above, warning is desirable and indicator means may be provided for giving a visual indication, for example a signal lamp may be operated, if the pulse interval is less than this predetermined period. Similarly indicator means may be provided for warning if the interval between a pair of successive pulses exceeds some maximum figure, e.g. 460 milliseconds corresponding to a pulse frequency of 30 per minute.

I claim:

1. Apparatus for determining the repetition frequency of repetitive input pulse signals comprising a constant frequency oscillator, a main counter fed from said oscillator and operative, when started, to count down on receipt of each successive signal fed from said oscillator to the main counter, reset means for said main counter operative on receipt of a reset signal to reset the main counter to a predetermined datum, a sequence counter triggered by each of said input pulse signals to start counting signals from said oscillator on receipt of each input pulse signal and operative to reset and restart the main counter, means operated by the main counter to reset the sequence counter after the main counter has started counting down, means responsive to the output of the main counter operative to reduce periodically the rate of feeding of signals from said oscillator to said main counter, and output means responsive to the counted down output of the main counter at the end of the count down.

2. Apparatus for determining the repetition frequency of repetitive input pulse signals comprising a constant frequency oscillator, a main counter fed from said oscillator and operative, when started, to count on receipt of each successive signal fed from said oscillator to said main counter, reset means for said main counter operative on receipt of a reset signal to reset the main counter to a predetermined datum, staticizing means coupled to said main counter operative on receipt of a staticizing signal to store the instantaneous count in said main counter, a sequence counter triggered by each of said input pulse signals to start counting regularly repetitive signals from said oscillator and operative firstly to feed a staticizing signal to said staticizing means and subsequently to reset and restart the main counter, and means operated by the main counter to reset the sequence counter after the main counter has started counting.

3. Apparatus as claimed in claim 2 and having a digital output indicating device giving a visual numerical indication coupled to said staticizing means.

4. Apparatus for determining the repetition frequency of repetitive input pulse signals comprising a constant frequency oscillator, a number of dividers coupled to said oscillator to provide output pulses at a number of different repetition frequencies which are sub-multiples of the oscillator output frequency, a main counter operative, when started, to count pulses fed to it, gate means for feeding to said main counter pulse signals from a selected one of said frequency dividers, reset means for said main counter operative on receipt of a reset signal to reset the main counter to a predetermined datum, a sequence counter triggered by each of said input pulse signals to start counting constant frequency signals derived from said oscillator and operative to reset and restart the main counter after receipt of each input pulse signal, means operated by the main counter to reset the sequence counter after the main counter has started counting, means responsive to the output of the main counter operative to periodically switch said gate means so that lower frequency signals are fed to said main counter, and output means responsive to the count on the main counter each time one of said input pulse signals is received.

5. Apparatus for determining the repetition frequency of repetitive input pulse signals comprising a constant frequency oscillator, a number of dividers coupled to said oscillator to provide output pulses at a number of different repetition frequencies which are sub-multiples of the oscillator output frequency, a main counter operative, when started, to count pulses fed to it, gate means for feeding to said main counter pulse signals from a selected one of said frequency dividers, reset means for said main counter operative on receipt of a reset signal to reset the main counter to a predetermined datum, staticizing means coupled to said main counter operative on receipt of a staticizing signal to store the instantaneous count in said main counter, a sequence counter triggered by each of said input pulse signals to start counting constant frequency signals derived from said oscillator and operative firstly to feed a staticizing signal to said staticizing means and subsequently to reset and restart the main counter after receipt of each input pulse signal, means operated by the main counter to reset the sequence counter after the main counter has started counting, and means responsive to the output of the main counter operative to periodically switch said gate means so that lower frequency signals are fed to said main counter.

No references cited.

MAYNARD R. WILBUR, *Primary Examiner.*

MALCOLM A. MORRISON, *Examiner.*

J. F. MILLER, *Assistant Examiner.*